United States Patent [19]
Kaji

[11] Patent Number: 5,353,067
[45] Date of Patent: Oct. 4, 1994

[54] IMAGE DATA CONVERSION CIRCUIT HAVING A VERTICAL FILTER FOR PREVENTING DETERIORATION IN QUALITY OF A REDUCED IMAGE

[75] Inventor: Yoshiaki Kaji, Itami, Japan

[73] Assignee: Mitsubishi Denki Kabushiki Kaisha, Tokyo, Japan

[21] Appl. No.: 136,275

[22] Filed: Oct. 15, 1993

[30] Foreign Application Priority Data

Nov. 30, 1992 [JP] Japan .................. 4-319875

[51] Int. Cl.$^5$ ............................ H04N 3/223
[52] U.S. Cl. ........................ 348/568; 348/704
[58] Field of Search ............ 358/140, 180, 160, 138;
348/568, 704, 565; H04N 3/223

[56] References Cited

U.S. PATENT DOCUMENTS

| | | | |
|---|---|---|---|
| 4,610,026 | 9/1986 | Tabata et al. | 358/180 X |
| 4,707,742 | 11/1987 | Field et al. | 358/180 X |
| 4,768,093 | 8/1988 | Prodan | 358/180 |
| 5,025,315 | 6/1991 | Johary et al. | 358/180 X |

FOREIGN PATENT DOCUMENTS 63-33077  2/1988  Japan .

*Primary Examiner*—Victor R. Kostak
*Attorney, Agent, or Firm*—Oblon, Spivak, McClelland, Maier & Neustadt

[57] ABSTRACT

A vertical direction filter is realized without using an additional memory. If a reduction ratio is larger than ½, line memories (11) and (12) are connected in series with each other by switches (SW1) and (SW2) to thereby form one line memory which is capable of storing one original memory. If the reduction ratio is equal to or smaller than ½, inputs to and an output from the line memory (11) are each filtered by calculator units (13) and (14) and an adder (15) and then given to the line memory (12) and the switch (SW2) through the switch (SW1) as data about a filtered reduced line. Since the reduction ratio is equal to or smaller than ½, the line memories (11) and (12) are both capable of storing one reduced line. An output of the line memory (11) is given to an output terminal (71b) while an input to the line memory (11) is given to an output terminal (71c) through the switch (SW2). Thus, the line memories which are used in vertical decimation also function as a filter.

17 Claims, 7 Drawing Sheets

IMAGE DATA CONVERSION CIRCUIT HAVING A VERTICAL FILTER FOR PREVENTING DETERIORATION IN QUALITY OF A REDUCED IMAGE

BACKGROUND OF THE INVENTION

1. Field of the Invention

The present invention relates to processing of an image signal, and more particularly, to reduction of an image.

2. Description of the Prior Art

There is a need for displaying a second image within a certain image. In this case, the second image is reduced to be displayed. When these images are each composed of vertical arrays of lines consisting of dots which are arranged in a horizontal direction, decimation is performed as an image reducing method. Reduction of an image by decimation requires that decimation in the horizontal direction in each line is performed first and decimation in the vertical direction is performed next.

During decimation, aliasing may occur. If aliasing occurs, the quality of a reduced image is deteriorated. To prevent this, signals representing the image should be filtered before decimation. However, a line memory which is capable of storing data of one or more horizontal lines is necessary in order to form a vertical filter. Additional provision of such a memory demands increased costs.

SUMMARY OF THE INVENTION

An image data conversion circuit according to an aspect of the present invention comprises: a first decimation circuit for receiving a plurality of original lines which are arranged in a first direction by a first number to form an original image which is to be reduced and each of which consists of a second number of original dots which are arranged in a second direction which is perpendicular to the first direction, and for outputting reduced lines each consisting of a third number of reduced dots which are arranged in the second direction, the third number being smaller than the second number; and a second decimation circuit for receiving a plurality of the reduced lines and for outputting a fourth number of determined reduced lines which are arranged in the first direction to form a reduced image, the fourth number being smaller than the first number. The second decimation circuit comprises a line memory which is formed by a plurality of memory elements each capable of storing one of the reduced lines, and the sum of the memory capacities of the memory elements is sufficiently large to store one of the original line. The line memory is partitioned into a first portion which includes at least one of the memory elements and a second portion which includes at least one of the memory elements and which is disposed in front of the first portion. If a reduction ratio of the size of the reduced image to the size of the original image is larger than a predetermined, the second portion is combined with the first portion value so as to serially store the reduced lines. If the reduction ratio is equal to or smaller than the predetermined value, the second portion filters the reduced lines to obtain filtered reduced lines and the first portion serially stores the filtered reduced lines.

Preferably, the first number and the third number are equal to the second number and the fourth number, respectively.

Alternately, the line memory is an FIFO (First In First Out) type memory.

Alternately, in the first decimation circuit, of the original dots, a first interpolation computation is performed to calculate at least one interpolation dot based on two adjacent specified dots of the same original line. The reduced dots are selected from the specified dots and the interpolation dot.

Preferably, the first decimation circuit comprises: a latch which comprises an input terminal for receiving the original dots and an output terminal and which is capable of storing one of the original dots; a bypass comprising an input terminal and an output terminal, the input terminal of the bypass being connected to the input terminal of the latch; first interpolation calculating means comprising a plurality of input terminals and at least one output terminal, the input terminals of the first interpolation calculating means being connected to the output terminals of the latch and the bypass, the output terminal of the first interpolation calculating means receiving a result of the first interpolation computation; and a first selector comprising a plurality of input terminals which are connected to the output terminals of the latch, the bypass and the first interpolation calculating means, the first selector outputting the reduced dots.

In another aspect of the present invention, the second decimation circuit comprises: a computation part for performing a predetermined computation on at least two of inputs which are given to and outputs which are available from the memory element which belongs to the second portion and for obtaining the filtered reduced lines; and a bypass in which the filtered reduction lines which are serially stored in the first portion are serially read from the first portion, when one of the filtered reduced lines is read from the first portion, in synchronism with this, a subsequent one of the filtered reduced lines which was calculated following the one of the filtered reduced lines becoming available into the bypass. One of the determined reduced lines may be generated from the one and the subsequent one of the filtered reduced lines.

Further, in second decimation circuit, a second interpolation computation may be performed to obtain at least one interpolation line based on the one and the subsequent one of the filtered reduced lines to thereby select one of the determined reduced lines from the interpolation line and the one and the subsequent one of the filtered reduced lines.

Further, second decimation circuit comprises: second interpolation calculating means for receiving outputs of the first portion of the line memory and the bypass and for outputting the second interpolation line; and a second selector receiving, at a plurality of input terminals, outputs of the output terminals of the first portion of the line memory, the bypass and the second interpolation line, the second selector outputting the determined reduced lines.

Alternately, each of the memory element having a word length which is half the number of the original dots which are included in one of the original lines and a data width which is twice a bit number A which is needed to express the original dots. The second portion corresponds to a most significant side memory of the memory element having the most significant bits A. The first portion corresponds to a least significant side memory of the memory element having the least significant bits A.

In a further aspect of the present invention, the computation part may comprise: a multiplier for multiplying at least two or more of inputs which are given to and the outputs which are available from the memory elements respectively by predetermined coefficients; and an adder for adding up results which are obtained by the multiplier. An output of the adder corresponds to each of the filtered reduced lines.

In still other aspect of the present invention, the image data conversion circuit further comprises at least one selection means for determining which two of inputs which are given to and outputs which are available from the memory elements should be processed using the predetermined coefficients.

Alternately, the multiplier comprises: a first multiplier element for multiplying an input to be given to the second portion by one of the predetermined coefficients; and a second multiplier element for multiplying an output of the second portion by one of the predetermined coefficients.

In still other aspect of the present invention, the memory capacities of the first and the second portions are preferably changeable depending on the lengths of the reduced lines.

Further, second decimation circuit may comprise first switch-over means for determining whether the memory elements should belong to the first portion or the second portion, the first switch-over means being disposed between the memory elements.

Further, the second decimation circuit may further comprise second switch-over means, the second switch-over means giving the bypass to the second portion in accordance with a change in the structure of the second portion due to a switch-over operation of the first switch-over means.

Further, the second switch-over means is preferably capable of performing as many switch-over selections as the number of the memory elements which are included in the second portion.

Further, the second decimation circuit preferably further comprises control means for controlling the first and the second switch-over means.

As described above, depending on the reduction ratio, the line memory remains as it is to contribute to vertical decimation and becomes divided into the first and the second portions to function as such. In the latter case, the first portion directly contributes to vertical decimation but the second portion functions as a filter for performing filtering prior to vertical decimation.

The computation part and the second portion form the filter. The computation part may be comprised of a multiplier and an adder.

If the selection means is disposed, it is possible to choose which of the inputs to and the output from the memory elements is to be multiplied by the multiplier.

The degree of the filter can be selected from a wide range of variations by increasing the capacity of the second portion without sacrificing the capacity of the first portion.

Thus, according to the present invention, the filter for filtering vertical direction data of an image is realized without using an additional line memory. Hence, an inexpensive image data conversion circuit is obtainable which creates a high quality image.

In addition, since the number of inputs to the filter can be changed by means of the selection means to change the characteristics of the filter, it is possible to create a high quality reduced image in accordance with the reduction ratio.

Accordingly, it is an object of the present invention to offer an image data conversion circuit which prevents deterioration in the quality of a reduced image by means of a vertical filter which is formed without using an additional memory.

These and other objects, features, aspects and advantages of the present invention will become more apparent from the following detailed description of the present invention when taken in conjunction with the accompanying drawings.

DESCRIPTION OF THE PREFERRED EMBODIMENTS

<A. Basic Procedures of Decimation>

It is believed important to explain basic procedures of decimation before describing specific structures and operations according to the present invention.

Figure 5:
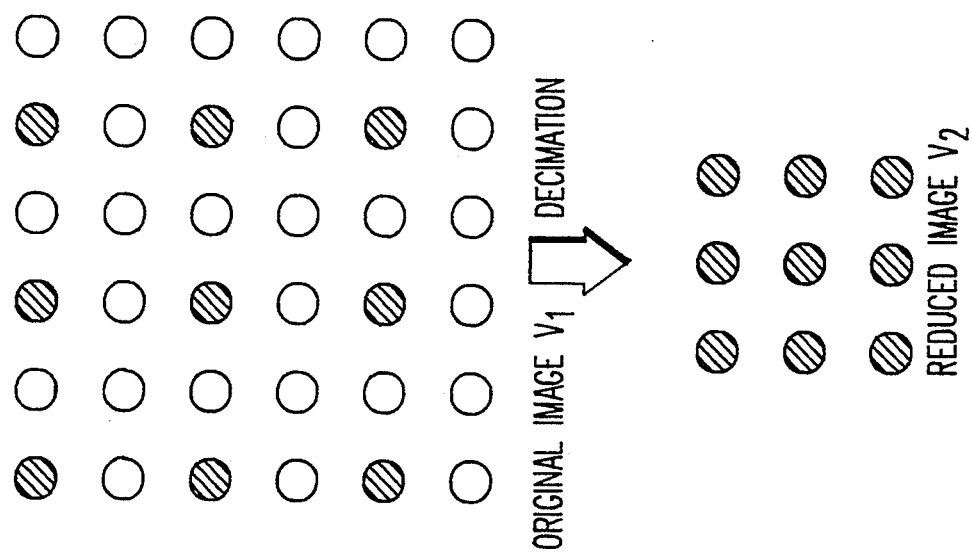
FIGS. 5 to 7 are conceptual views for explaining basic procedures of decimation.

FIG. 5 is a conceptual view showing how reduction of an image and decimation relate with each other. An image before reduction (hereinafter "original image") $V_1$ consists of six lines (lines constituting an original image will be referred to as original lines in the following description). One original line consists of six dots which are arranged in the horizontal direction. In other words, the original image $V_1$ consists of $6 \times 6$ dots.

Basic decimation procedures to reduce the original image $V_1$ to an image $V_2$ which consists of $3 \times 3$ dots (an image after reduction will be hereinafter referred to as a reduced image) involves decimation in the horizontal direction, i.e., first decimation stage, and decimation in the vertical direction, i.e., second decimation stage.

At the first stage of decimation, a line which could form a reduced image (hereinafter "reduced line") is created from one original line. In this case, a reduction line consists of three dots. Hence, in the simplest decimation, every other dot is selected from the six dots which constitute the original line in order to obtain the reduced line. For instance, the first, the third and the fifth dots from the left are selected.

At the second stage of decimation, three reduced lines to form the reduced image are selected from six reduced lines. For example, the first, the third and the fifth reduced lines from the top are selected.

As a result, as shown in FIG. 5, of the $6 \times 6$ dots forming the original image $V_1$, only the $3 \times 3$ dots that are shadowed by hatching are selected to form the reduced image $V_2$. In the following description, dots which form the original image before reduction will be referred to as original dots and dots which form the reduced image after reduced will be referred to as reduction dots.

Different from above, if there is a need to reduce the image size to four-fifths, for example, the original dots must be reduced in number to four-fifths to determine them as the reduced dots, and the original lines must be reduced in number to four-fifths in the vertical direction to use them as the reduced lines. That is, in the horizontal direction, four reduction dots have to be selected from five original dots, and in the vertical direction, four reduction lines have to be selected from five original lines.

However, reduced dots are not necessarily selected from original dots. To suppress deterioration in the image quality due to decimation of data, data to be outputted must be selected uniformly from the original image as a whole. To this end, between two adjacent original dots in the horizontal direction in the same original line (hereinafter "specified dots"), three interpolation dots must be calculated by linear interpolation computation, and an interpolation line must be formed by the specified dots and the interpolation dots. On appearance, the interpolation line contains dots as many as four times that of the original dots. From the interpolation dots and the specified dots, reduced dots are selected.

Figure 6:
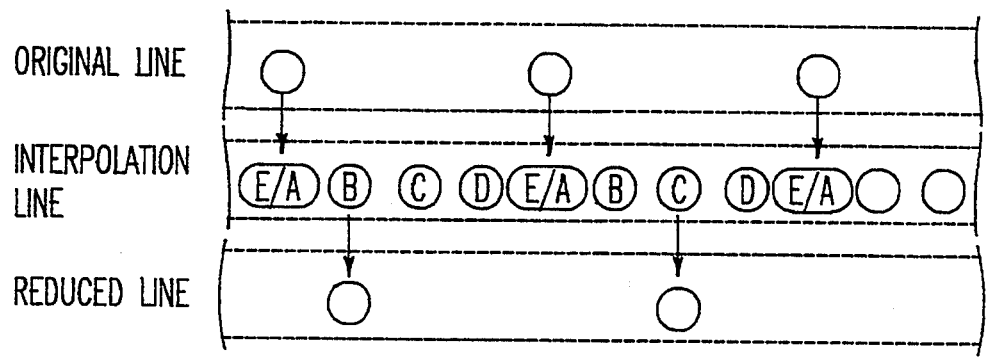

FIG. 6 is a conceptual view showing a method of calculating interpolation dots from specified dots and obtaining a reduced line from an interpolation line which consists of the specified dots and the interpolation dots. The illustrated operation is performed at the first decimation stage. In reality, an interpolation line is recognized between the specified dots. In the case of FIG. 6, of the specified dots, the one on the left hand side is regarded as a dot A and the one on the right hand side is regarded as a dot E. The specified dots A and E form an interpolation line.

Interpolation dots B, C and D are obtained from the specified dots A and E by interpolation computation. Such interpolation dots are calculated every time different dots are designated as specified dots. Hence, depending on whether located at the left hand side end or at the right hand side end of a certain section in which interpolation dots are to be obtained, specified dots are each regarded as the specified dot A or the specified dot E.

Since the original dots must be reduced in number to four-fifths as the reduced dots in this case, the interpolation dot B is selected as a reduction dot in the left end section of FIG. 6 while the interpolation dot C is selected as a reduced dot in the center section. Thus, reduction dots are not necessarily selected from specified dots (i.e., original dots).

Figure 7:
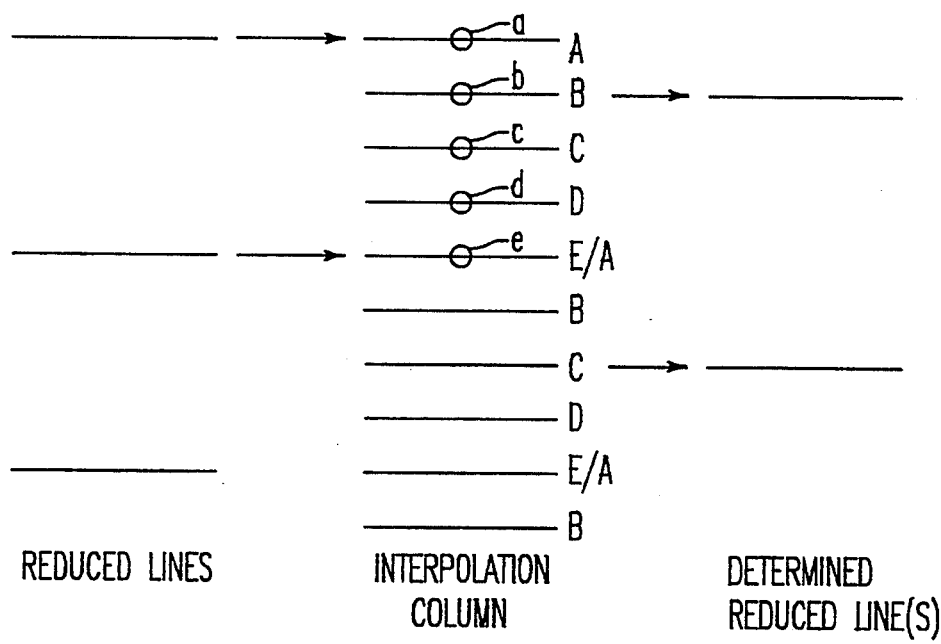

FIG. 7 is a conceptual view diagrammatically showing a method of obtaining reduced lines from all reduction lines to form a reduced image. Likewise the first stage of decimation, three lines are created by interpolation computation between two reduced lines which are arranged adjacent each other in the vertical direction so that an interpolation column is generated which on appearance includes as many interpolation lines as four times that of the original lines. Then, from the interpolation column, reduction lines for constituting a reduced image are selected.

Figure 8:
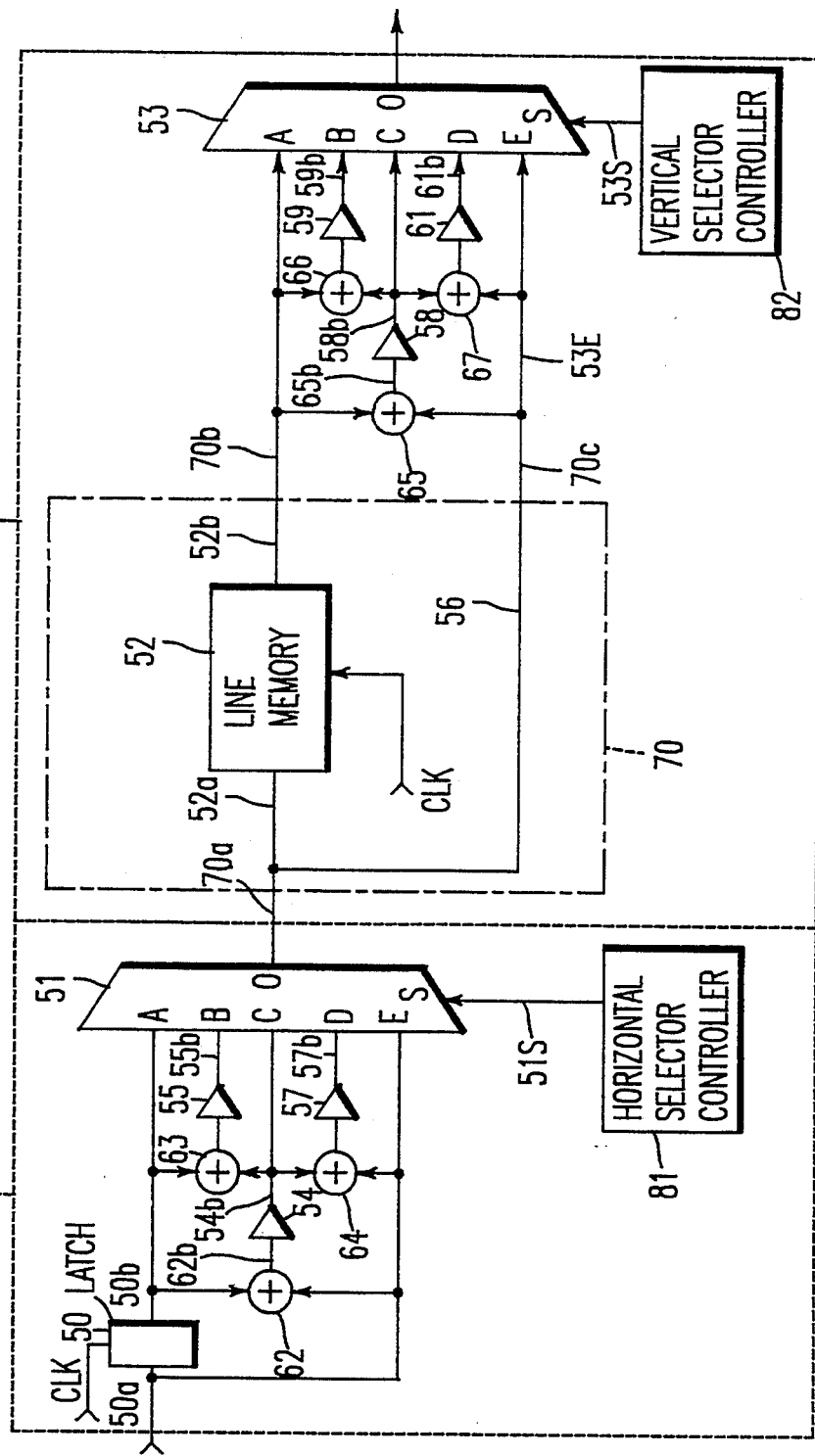
FIG. 8 is a block diagram of an image data conversion circuit for performing the basic procedures of decimation.

FIG. 8 is a block diagram showing an image data conversion circuit for performing decimation as above.

The image data conversion circuit comprises a horizontal direction decimation circuit 91 which corresponds to FIG. 6 and a vertical direction decimation circuit 92 which corresponds to FIG. 7. The decimation circuits 91 and 92 are connected in series with each other.

The horizontal direction decimation circuit 91 is comprised of a latch 50, calculator units 54, 55 and 57, adders 62 to 64, a horizontal selector 51 and a horizontal selector controller 81.

The horizontal selector 51 comprises input terminals A to E for receiving five data which correspond to the specified dots and the interpolation dots each indicated at A, B, C, D or E in FIG. 6. The horizontal selector 51 also comprises an output terminal O for outputting data which are selected as data about a reduced dot from the data which are received at the input terminals A to E.

The latch 50 receives a dot clock CLK while in synchronism with this receiving data about an original dot at its input terminal 50a. The received original dot is temporarily held in the latch 50 and then outputted at an output terminal 50b of the latch 50 in response to the next dot clock CLK. At the same time with this, data about the next original dot is supplied to the input terminal 50a of the latch 50. Hence, data about two specified dots are present at the input terminal 50a and the output terminal 50b of the latch 50.

The adder 62 receives the data about these specified dots and outputs at its output terminal 62b a result of addition of these data. Assuming that of the two specified dots, one has a value $\alpha$ and the other has a value $\beta$, a value $\alpha + \beta$ is available at the output terminal 62b.

On the other hand, the calculator unit 54 halves and outputs data that are received therein. Since an input terminal of the calculator unit 54 is connected to the output terminal 62b of the adder 62, a value $(\alpha + \beta)/2$ is outputted at an output terminal 54b of the calculator unit 54.

The adders 63 and 64 are both capable of receiving two inputs, adding them up and outputting a result. Of the two input terminals of the adder 63, one is connected to the output terminal 50b of the latch 50 and the other is connected to the output terminal 54b of the calculator unit 54. Of the two input terminals of the adder 63, one is connected to the input terminal 50a of the latch 50 and the other is connected to the output terminal 54b of the calculator unit 54, respectively.

The calculator units 55 and 57 both halve and output the value of data that are received therein. Input terminals of the calculator units 55 and 57 are coupled to outputs of the adders 63 and 64, respectively. The input terminals A, B, C, D and E of the selector 51 are connected to the output terminal 50b of the latch 50, the output terminal 55b of the calculator unit 55, the output terminal 54b of the calculator unit 54, an output terminal 57b of the calculator unit 57 and the input terminal 50a of the latch 50, respectively. Hence, at the respective input terminals A to E, $$A = \alpha$$

$$B = \frac{3\alpha + \beta}{4}$$

$$C = \frac{\alpha + \beta}{2}$$

$$D = \frac{\alpha + \beta}{4}$$

-continued
$$E = \beta$$

are calculated and inputted.

A select control terminal S of the horizontal selector 51 is coupled to a select control signal 51S which is supplied from the horizontal selector controller 81. Under the control of the select control signal 51S, the horizontal selector 51 selects one of the data which are received at the input terminals A to E and outputs the selected data at the output terminal O. This operation corresponds to selection of one reduced dot from the specified dots A and E and the interpolation dots B, C and D in the example described with reference to FIG. 6.

The data of reduced dots are serially stored in a line memory 52 of the vertical direction decimation circuit 92. The line memory 52 has an input terminal 52a and an output terminal 52b. The capacity of the line memory 52 is sufficiently large to store the total data about all original dots of one original line. This is because the image data conversion circuit cannot deal with a demand for no reduction of an image (i.e., where all specified dots are to be treated as reduced dots) if the line memory 52 is only capable of storing the total data about reduced dots which are included in one reduction line.

First, where an image is to be reduced will be described. The dot clock CLK is fed to the line memory 52 as well, in synchronism with which the data about a reduced dot is stored in the line memory 52. If data about the last reduction dot of one reduced line is completely written to the line memory, data about a first reduced dot of the next reduction line are given to the input terminal 52a.

At this stage where the data about the reduced dots of an x-th reduction line are stored in the line memory 52 and the data of the first reduced dot of the next (x+1)-th reduction line is present at the input terminal 52a, in response to the dot clock CLK, data about the first reduced dot of the x-th reduction line are shifted to the output terminal 52b of the line memory 52.

At a point when data about the second reduced dot of the (x+1)-th reduced line are supplied to the input terminal 52a following this, the data about the first reduction dot of (x+1)-th reduced line are stored at the same address at which the data about the first reduction dot of the x-th reduction line has been stored.

In short, at the output terminal 52b and the input terminal 52a of the line memory 52, data about two vertically adjacent reduced dots are always present. Being an FIFO type memory, unless running short of the memory capacity, the line memory 52 maintains this condition regardless of the number of the reduced dots of the reduction line. The vertical direction decimation circuit 92 finds these two reduced dots (hereinafter "specified reduction dots") and dots which form the interpolation column of FIG. 7 (hereinafter "interpolation reduced dots"). The vertical direction decimation circuit 92 then eventually selects and outputs reduced dots which form the original image (hereinafter "determined reduced dots"). In this manner, lines which form a reduced image (hereinafter "determined reduced lines") are obtained.

The vertical direction decimation circuit 92 is comprised of the line memory 52 described above, calculator units 58, 59 and 61, adders 65 to 67, a vertical selector 53 and a vertical selector controller 82.

The vertical selector 53 comprises input terminals A to E for receiving data about vertically adjacent five dots a to e of interpolation reduced dots which form the interpolation line column which is indicated at A to E of FIG. 7. The vertical selector 53 also comprises an output terminal O for outputting data which are selected from the data received at the input terminals A to E as data which represent a determined reduced dot.

In the vertical direction decimation circuit 92, the line memory 52, the calculator units 58, 59 and 61, the adders 65 to 67, the vertical selector 53 and the vertical selector controller 82 are connected with each other in the same manner as that the latch 50, the calculator units 54, 55 and 57, the adders 62 to 64, the horizontal selector 51 and the horizontal selector controller 81 are connected with each other in the horizontal direction decimation circuit.

The line memory 52 and a wire 56 which is connected to the input terminal 52a of the line memory 52 form a vertical decimation forward stage 70. The vertical decimation forward stage 70 comprises an input terminal 70a for connecting the output terminal O of the horizontal selector 51 to the input terminal 52a of the line memory 52. The vertical decimation forward stage 70 also comprises output terminals 70b and 70c for connecting two input terminals of the adder 65 respectively to the output terminal 52b of the line memory 52 and the wire 56.

Hence, where data about reduced dots which are present at the output terminals 70b and 70c of the vertical decimation forward stage 70 are U and D, respectively, at the input terminals A to E of the vertical selector 53, $$A = U$$

$$B = \frac{3U + D}{4}$$

$$C = \frac{U + D}{2}$$

$$D = \frac{U + 3D}{4}$$

$$E = D$$

are calculated and inputted.

The vertical selector 53 receives at its select control terminal S a select control signal 53S which is given from the vertical selector controller 82. In response to the select control signal 53S, the vertical selector 53 selects one of the data which are received at the input terminals A to E and outputs the selected data at the output terminal O. This operation corresponds to selection of one determined reduced dot by decimating the interpolation column which is indicated at A to E in the example shown in FIG. 7.

However, as described earlier in relation to the prior art, to prevent aliasing, a vertical direction filter needs to be disposed. Therefore, the basic idea which lies in the present invention is to improve the line memory which can store as much data as one whole original line and which is disposed in the vertical decimation forward stage such that the line memory will function as a vertical direction filter as well. In the following, various preferred embodiments will be described.

<B. First Preferred Embodiment>

A first preferred embodiment requires that the filter function is not activated when a ratio of a reduced image to an original image is larger than ½ but activated when the ratio is ½ or smaller than that ("ratio" herein termed is not a space ratio but is a ratio in both the horizontal and the vertical directions).

Figure 1:
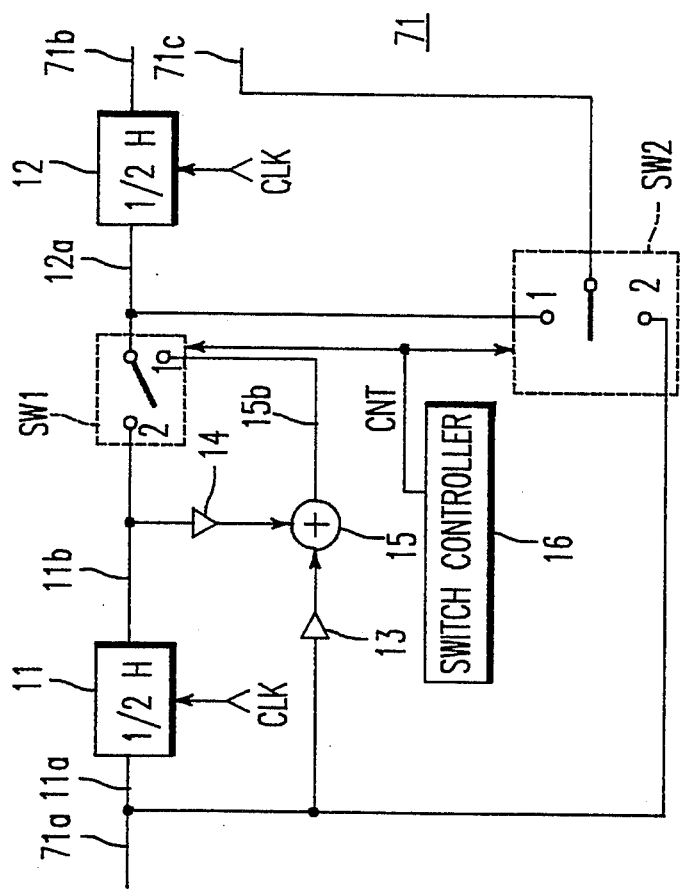
FIG. 1 is a circuitry diagram for explaining a first preferred embodiment of the present invention.

FIG. 1 is a block diagram showing the structure of a vertical decimation forward stage 71 used in the first preferred embodiment. The vertical decimation forward stage 71 comprises an input terminal 71a and output terminals 71b and 71c which respectively correspond to the input terminal 70a and the output terminals 70b and 70c of the vertical decimation forward stage 70 which have been described in <A. Basic Procedures of Decimation>. That is, the vertical decimation forward stage 71, having its input terminal 71a connected to the output terminal O of the horizontal selector 51 shown in FIG. 8, is connected to the horizontal direction decimation circuit 91. In addition, having the output terminals 71b and 71c connected to the adder 65 shown in FIG. 8, the vertical decimation forward stage 71 forms a portion of the vertical direction decimation circuit 92. In other words, by replacing the vertical decimation forward stage 70 of FIG. 8 with the vertical decimation forward stage 71, an image data conversion circuit of the first preferred embodiment of the present invention is formed.

In the vertical decimation forward stage 71, between the input terminal 71a and the output terminal 71b, disposed in series are a switch SW1, line memories 11 and 12 each of which has a data capacity for storing half an original line and operates in synchronism with the dot clock CLK. The line memories 11 and 12 are each constituted as an FIFO type memory. In FIG. 1, the symbol "½H" indicates that the data capacity of each line memory is half a capacity H that is necessary for storing one original line.

The switch SW1 comprises a common terminal, a side 1 terminal and a side 2 terminal. The common terminal is connected to an input terminal 12a of the line memory 12 and the side 2 terminal is connected to an output terminal 11b of the line memory 11. The side 1 terminal of the switch SW1 is connected to an output terminal 15b of an adder 15 which adds two inputs received therein.

A switch SW2 is disposed between the input terminal 71a and the output terminal 71c. The switch SW2 comprises a common terminal, a side 1 terminal and a side 2 terminal. The common terminal is connected to the output terminal 71c and the side 2 terminal is connected to the input terminal 71a. The side 1 terminal of the switch SW1 is connected to the input terminal 12a of the line memory 12 as the common terminal of the switch SW1 is.

Calculator units 13 and 14 multiply received data by respective predetermined values. The calculator units 13 and 14 process data which are given to the input terminal 71a of the vertical decimation forward stage 71 and data which are given to the output terminal 11b of the line memory 11, respectively. Results of computations at the calculator units 13 and 14 are both fed to the adder 15.

A switch controller 16 supplies a switch control signal CNT to the switches SW1 and SW2. If an original image needs not be reduced or if the reduction ratio is lager than ½, the common terminals of both the switches SW1 and SW2 are connected to the associated side 2 terminals under the control of the switch control signal CNT. As a result, the output terminal 11b of the line memory 11 and the input terminal 12a of the line memory 12 are connected with each other through the switch SW1. More particularly, the line memories 11 and 12 are connected in series to thereby function as one line memory which is capable of storing one whole original line. This corresponds to the line memory 52 of FIG. 8. Since the line memories 11 and 12 are each an FIFO type memory, unless running short of the memory capacities, the line memories operate normally regardless of the number of reduction dots which constitute the reduction line. So, when the reduction ratio is equal to ½, the vertical decimation forward stage 71 can be used with the common terminals of both the switches SW1 and SW2 connected to the associated side 2 terminals.

When the input terminal 71a and the output terminal 71c of the vertical decimation forward stage 71 are connected with each other through the switch SW2, the wire 56 of FIG. 8 is realized. Hence, in this case, the vertical decimation forward stage 71 functions the same as the vertical decimation forward stage 70 of FIG. 8.

On the other hand, when the reduction ratio is equal to or less than ½, the common terminals of both the switches SW1 and SW2 are connected to the associated side 1 terminals under the control of the switch control signal CNT. As a result, data at the input terminal 71a of the vertical decimation forward stage 71 and data at output terminal 11b of the line memory 11 are processed by the calculator units 13 and 14 and the adder 15 as described later and then given to both the input terminal 12a of the line memory 12 and the output terminal 71c of the vertical decimation forward stage 71.

To the input terminal 71a of the vertical decimation forward stage 71, data about a reduced dot which was selected by the horizontal selector 51 are supplied. The data of the selected dots are serially stored in the line memory 11. Although the line memory 11 is capable of storing half a one original line, since the reduced image is half the original image or smaller than that, data of reduced lines would not overflow.

After data about the last reduction dot of an x-th reduced line have been stored in the line memory 11, data about the first reduced dot of an (x+1)-th reduced line are supplied to the input terminal 11a of the line memory 11. Concurrently with this, data about the first reduced dot of the x-th reduced line are allowed to the output terminal 11b of the line memory 11. Following this, data about the reduced dots of the (x+1)-th reduction line are serially inputted to the input terminal 11a of the line memory 11. At every entry in the course of this, data about the reduced dots of the x-th reduction line are serially supplied to the output terminal 11b of the line memory 11.

Hence, of the data about the reduced dots of the x-th reduction line and the data about the reduced dots of the (x+1)-th reduction line, two vertically adjacent data are present at the output terminal 11b and the input terminal 11a at the same time, which is similar to the relation between the data which appear at the output terminals 70b and 70c of the vertical decimation forward stage 70 described in <A. Basic Procedures of Decimation>.

On the other hand, the data given to the input terminal 11a and the output terminal 11b of the line memory 11 are multiplied by predetermined constants respectively in the calculator units 13 and 14 and then added together at the adder 15. That is, of the data about the reduced dots of the x-th reduced line and the data about the reduction dots of the (x+1)-th reduction line, two vertically adjacent data are processed by a two-terminal filter which comprises the calculator units 13 and 14 and the adder 15 to be thereby synthesized into one data. Through these procedures performed repeatedly, the data about the reduced lines are filtered.

Reduction lines which are filtered (hereinafter "filtered reduced lines") are given to the line memory 12 and the output terminal 71c of the vertical decimation forward stage 71 through the switches SW1 and SW2. Since the line memory 12 has a memory capacity for storing half an original line, a sufficiently large capacity to store a reduced line which is reduced at a reduction ratio of $\frac{1}{2}$ or less, the line memory 12 can operate similarly to the line memory 52 as described in <A. Basic Procedures of Decimation>.

More precisely, what is available at the output terminal 71b is a dot which is obtained from the x-th and the (x+1)-th reduced lines to eventually form the x-th reduced line (hereinafter "filtered reduction dot") and what is available at the output terminal 71c is a filtered reduced dot which forms an (x+1)-th filtered reduced line and which is located adjacent in the vertical direction to the filtered reduced dot which appears at the output terminal 71b.

Following this, from the x-th and the (x+1)-th filtered reduced lines, an interpolation column is calculated and determined reduced lines are selected by vertical direction decimation.

Figure 2:
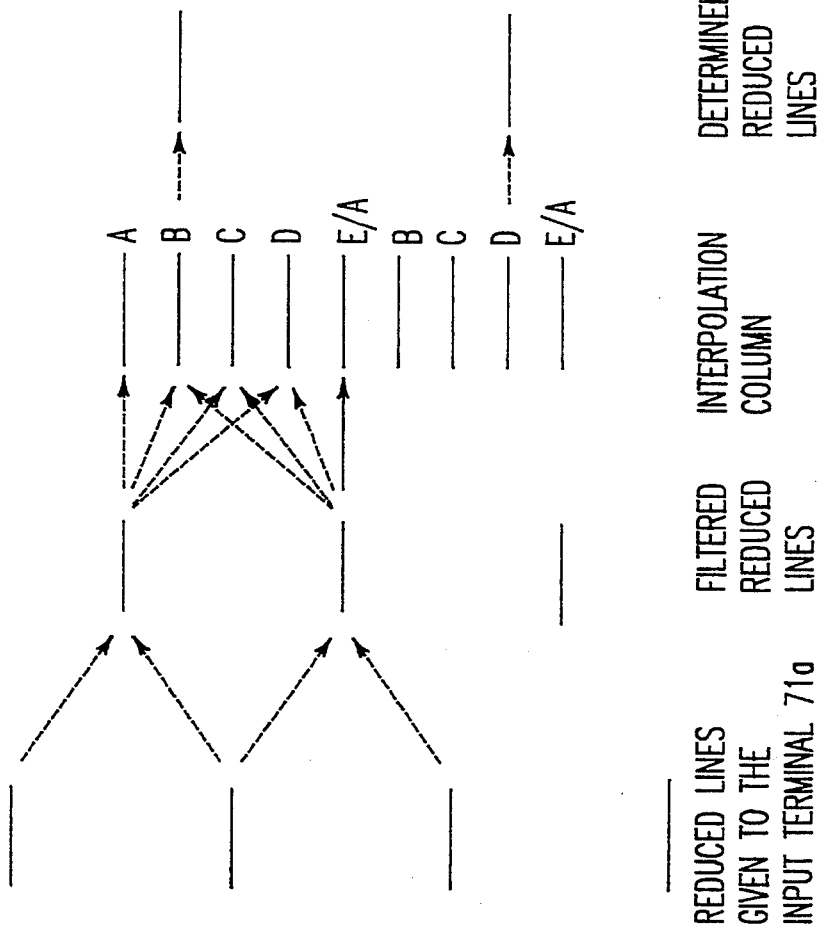
FIG. 2 is a conceptual view for explaining the first preferred embodiment of the present invention.

FIG. 2 is a conceptual view showing filtering during vertical direction decimation. From the left to the right, FIG. 2 shows a column of reduced lines, a column of filtered reduced lines, an interpolation column and a column of vertically decimated reduced lines (determined reduction lines). A relation between the interpolation column indicated at A to E and the column of the filtered reduced lines shown in FIG. 2 is the same as the relation between the interpolation column and the column of the reduced lines shown in FIG. 7.

As heretofore described, in the first preferred embodiment, although the sum of the capacities of the memory lines 11 and 12 of the vertical decimation forward stage 71 is equal to the capacity of the memory line 52 of the vertical decimation forward stage 70, it is possible to filter the reduced lines if the reduction ratio is $\frac{1}{2}$ or smaller than that. If the reduction ratio is larger than $\frac{1}{2}$, it is possible to perform regular decimation without carrying out filtering.

The switch controller 16, as described earlier, demands the switches SW1 and SW2 to select their side terminals for connection to the common terminals in accordance with the reduction ratio. Selections of terminals made in the switches SW1 and SW2 where the reduction ratio is K are summarized in Table 1.

TABLE 1

| Reduction Ratio K | Common Terminals of Switches are connected to: | |
|---|---|---|
| | SW1 | SW2 |
| K ≦ $\frac{1}{2}$ | 1 | 1 |
| $\frac{1}{2}$ < K | 2 | 2 |

<C. Second Preferred Embodiment>

In a second preferred embodiment as well, it is possible not to activate the filter function if the reduction ratio is larger than $\frac{1}{2}$ and to activate the filter function if the reduction ratio is equal to $\frac{1}{2}$ or smaller than that.

Figure 3:
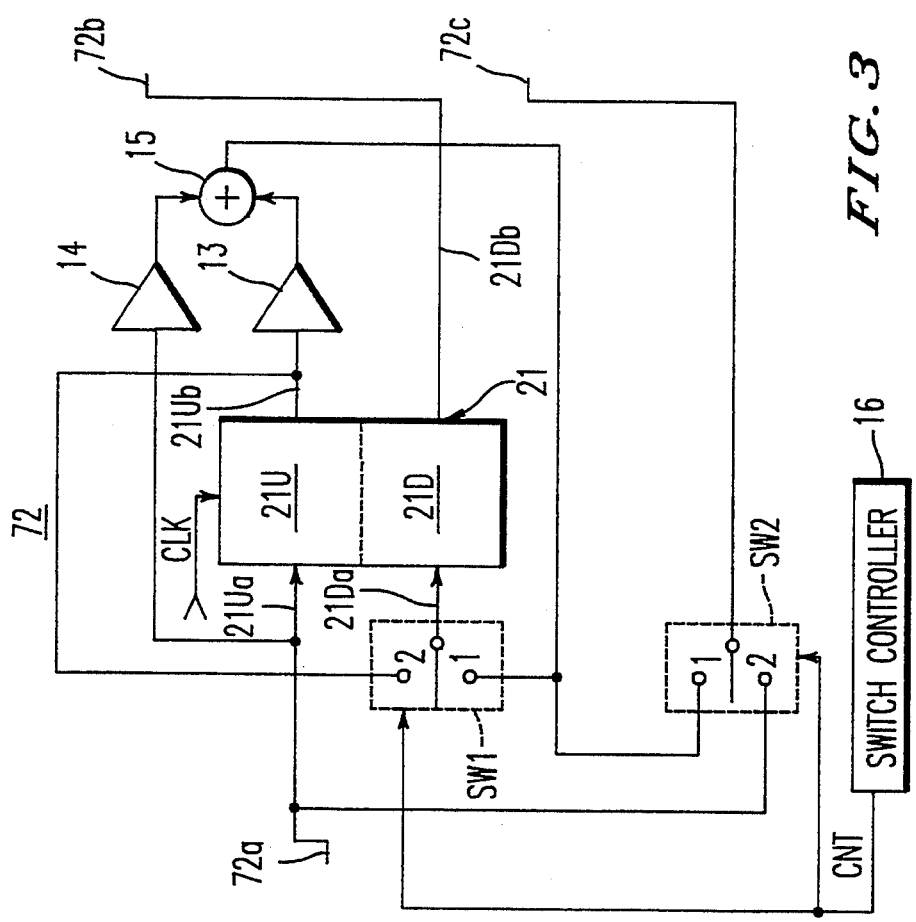
FIG. 3 is a circuitry diagram for explaining a second preferred embodiment of the present invention.

FIG. 3 is a block diagram showing the structure of a vertical decimation forward stage 72 used in the second preferred embodiment. The vertical decimation forward stage 72 comprises an input terminal 72a and output terminals 72b and 72c which respectively correspond to the input terminal 70a and the output terminals 70b and 70c of the vertical decimation forward stage described in <A. Basic Procedures of Decimation>. That is, by replacing the vertical decimation forward stage 70 with the vertical decimation forward stage 72 in the image data conversion circuit of FIG. 8, an image data conversion circuit of the second preferred embodiment of the present invention is realized.

A line memory 21 is formed by a memory which has a word length as small as half the number of reduced dots of one original line and has a data width which is as large as twice the bit number of data of an original dot. The line memory 21 is divided into a most significant side memory 21U and a least significant side memory 21D. If an original image contains 640 dots in the horizontal direction and data about one original dot are 8-bit data, for example, the most significant side memory 21U and the least significant side memory 21D are each constructed as a 320-word, 8-bit width (bit number) memory.

The vertical decimation forward stage 72 is equal to the vertical decimation forward stage 71 of the first preferred embodiment as it is modified by replacing the line memories 11 and 12 respectively with the most significant side memory 21U and the least significant side memory 21D. The most significant side memory 21U and the least significant side memory 21D are each an FIFO type memory.

Hence, the vertical decimation forward stage 72 functions in a manner similar to that described in the first preferred embodiment. If an original image needs not be reduced or if the reduction ratio is lager than $\frac{1}{2}$, the common terminals of both the switches SW1 and SW2 are both connected to the associated side 2 terminals under the control of the switch control signal CNT, whereby the most significant side memory 21U and the least significant side memory 21D are connected in series with each other through the switch SW1. Hence, the line memory 21 operates as a line memory having a memory capacity which is precisely equal to data about the original lines in terms of both the data width (bit number) and the word length. In this regard, the line memory 21 corresponds to the line memory 52 of FIG. 8.

When the input terminal 72a and the output terminal 72c of the vertical decimation forward stage 72 are connected with each other through the switch SW2, the wire 56 of FIG. 8 is realized. Hence, in this case, the vertical decimation forward stage 72 functions the same as the vertical decimation forward stage 70 of FIG. 8.

On the other hand, when the reduction ratio is $\frac{1}{2}$ or less than that, the common terminals of both the switches SW1 and SW2 are both connected to the associated side 1 terminals under the control of the switch control signal CNT. Therefore, data at an input terminal 21Ua of the most significant side memory 21U and data at an output terminal 21Ub of the most significant side memory 21U are filtered by a two-terminal filter which is formed by the calculator units 13 and 14 and the adder 15, and thereafter given to both an input terminal 21Da of the least significant side memory 21D and the output terminal 72c of the vertical decimation forward stage 72.

Hence, since similarly to the first preferred embodiment, data about an x-th filtered reduced line memory are given to the output terminal 72b while data about an (x+1)-th filtered reduced line memory are given to the output terminal 72c, from these data, an interpolation column is calculated.

<D. Third Preferred Embodiment>

It is also possible in a third preferred embodiment not to activate the filter function if the reduction ratio is larger than $\frac{1}{2}$ and to activate the filter function if the reduction ratio is equal to $\frac{1}{2}$ or smaller than that. In the third preferred embodiment, however, a filter which is activated when the reduction ratio is equal to $\frac{1}{4}$ or smaller than that has a different structure from that of a filter which is activated when the reduction ratio is larger than $\frac{1}{4}$ but is equal to or smaller than $\frac{1}{2}$.

Figure 4:
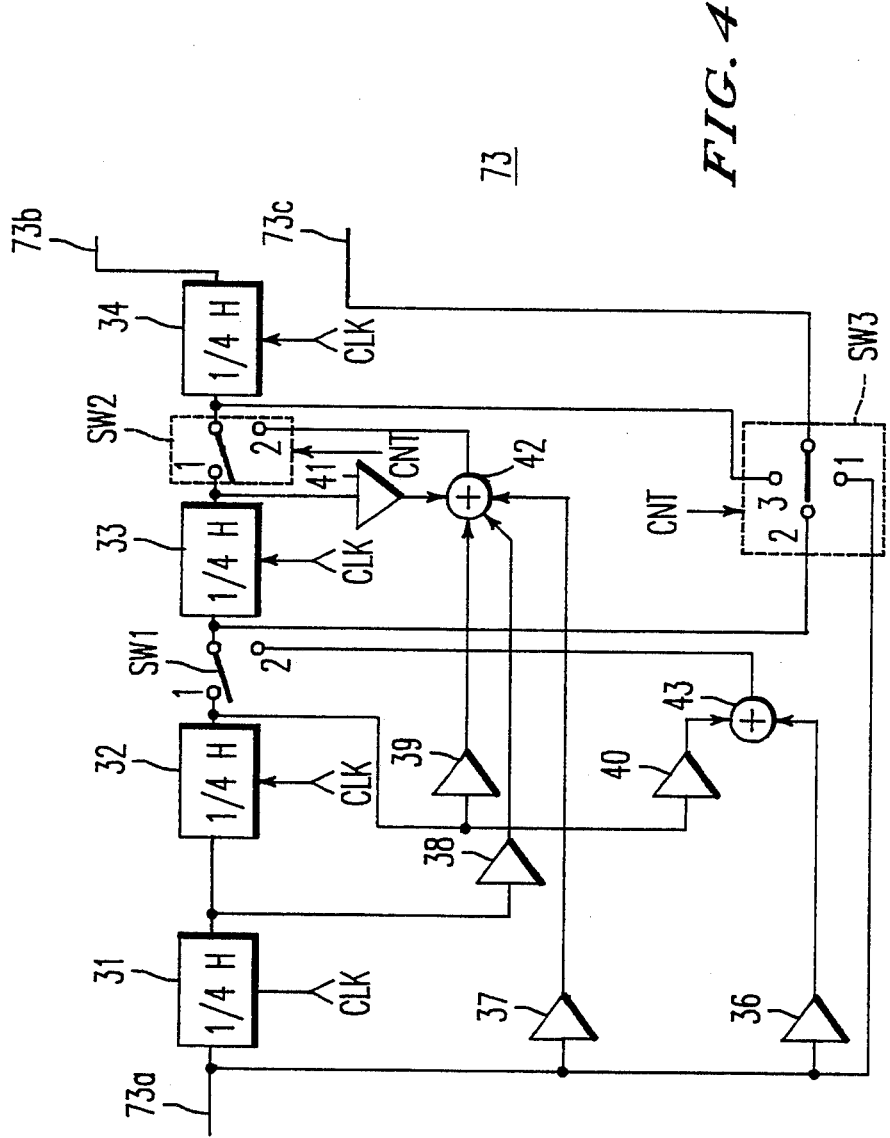
FIG. 4 is a circuitry diagram for explaining a third preferred embodiment of the present invention.

FIG. 4 is a block diagram showing the structure of a vertical decimation forward stage 73 used in the third preferred embodiment. The vertical decimation forward stage 73 comprises an input terminal 73a and output terminals 73b and 73c which respectively correspond to the input terminal 70a and the output terminals 70b and 70c of the vertical decimation forward stage 70 described in <A. Basic Procedures of Decimation>.

In the vertical decimation forward stage 73, between the input terminal 73a and the output terminal 73b and in series with the switches SW1 and SW2, line memories 31 to 34 are disposed each of which has a data capacity for storing a quarter of one original line and operates in synchronism with the dot clock CLK. In FIG. 4, the symbol "$\frac{1}{4}$H" denotes the data capacity of each line memory is one-fourth of the capacity H that is necessary for storing one original line. The line memories 31 to 34 are each formed as an FIFO type memory.

The switch SW1 comprises a common terminal, a side 1 terminal and a side 2 terminal. The common terminal is connected to an input terminal of the line memory 33 and the side 1 terminal is connected to an output terminal of the line memory 32. The switch SW2 comprises a common terminal, a side 1 terminal and a side 2 terminal. The common terminal of the switch SW2 is connected to an input terminal of the line memory 34 and the side 2 terminal of the switch SW2 is connected to an output terminal of the line memory 33.

A switch SW3 comprises a common terminal, a side 1 terminal, a side 2 terminal and a side 3 terminal. The common terminal of the switch SW3 is connected to the output terminal 73c. The side 3 terminal of the switch SW3 is connected to the input terminal of the line memory 34 similarly to the common terminal of the switch SW2. The side 2 terminal of the switch SW3 is connected to the input terminal of the line memory 33 likewise the common terminal of the switch SW1.

An input terminal of the line memory 31 is coupled to the input terminal 73a of the vertical decimation forward stage 73 as well as to input terminals of the calculator units 36 and 37. To an input terminal of the line memory 32, the output terminal of the line memory 31 and an input terminal of the calculator unit 38 are connected. The output terminal of the line memory 32 is coupled to the side 1 terminal of the switch SW1 and input terminals of the calculator units 39 and 40. The output terminal of the line memory 33 is connected to the side 1 terminal of the switch SW2 and an input terminal of the calculator unit 41.

The calculator units 36 to 41 are capable of multiplying data that are received therein respectively by predetermined coefficients. Outputs of the calculator units 36 and 40 are added up by a two-input adder 43 and then given to the side 2 terminal of the switch SW1. Outputs of the calculator units 37, 38, 39 and 41 are added up by a four-input adder 42 and then given also to the side 2 terminal of the switch SW2.

The input terminal 73a of the vertical decimation forward stage 73 is connected to the side 1 terminal of the switch SW3. The switches SW1, SW2 and SW3 select their side terminals for connection to the common terminals under the control of the switch control signal CNT. In FIG. 4, for clarity of illustration, a switch controller is omitted. Selections of terminals made in the switches SW1, SW2 and SW3 where the reduction ratio is K are shown in Table 2.

TABLE 2

| Reduction Ratio K | Common Terminals of Switches are connected to: | | |
|---|---|---|---|
| | SW1 | SW2 | SW3 |
| $K \leq \frac{1}{4}$ | 1 | 2 | 3 |
| $\frac{1}{4} < K \leq \frac{1}{2}$ | 2 | 1 | 2 |
| $\frac{1}{2} < K$ | 1 | 1 | 1 |

First, when the reduction ratio is larger than $\frac{1}{2}$, the common terminals of the switches SW1, SW2 and SW3 are all connected to the associated side 1 terminals. As a result, the line memories 31 to 34 function as one memory which is capable of storing one original line. Thus, the line memories 31 to 34 performs the same function as the line memory 52 shown in FIG. 8.

On the other hand, since the input terminal 73a of the vertical decimation forward stage 73 is connected to the output terminal 73c of the vertical decimation forward stage 73, the wire 56 shown in FIG. 8 is realized by the input terminal 73a and the output terminal 73c.

Hence, if the reduction ratio is larger than $\frac{1}{2}$, regular decimation is performed likewise in the first preferred embodiment.

Next, if the reduction ratio is larger than $\frac{1}{4}$ but is equal to or smaller than $\frac{1}{2}$, the common terminals of the switches SW1 SW2 and SW3 are connected to the associated side 2, the associated side 1 and the associated side 2 terminals, respectively. Hence, the memory lines 31 and 32 which are connected in series with each other and the memory lines 33 and 34 which are connected in series with each other respectively operate as the line memory 11 and the line memory 12 of the first preferred embodiment. In addition, the calculator units 36 and 40 function as the calculator units 13 and 14 of the first preferred embodiment, respectively. On the other hand, since the input terminal of the memory line 33 is connected to the output terminal 73c of the vertical decimation forward stage 73 by the switch SW3, the third preferred embodiment attains the same function which is promised in the first preferred embodiment in the case where the reduction ratio is equal to or smaller than $\frac{1}{2}$.

Next, when the reduction ratio is equal to or smaller than $\frac{1}{4}$, the common terminals of the switches SW1, SW2 and SW3 are connected to the associated side 1, the associated side 2 and the associated side 3 terminals, respectively.

Since the reduced ratio is equal to or smaller than $\frac{1}{4}$, the total data regarding the reduce dots of the reduction lines are equal to or less than a quarter of the data about the original image. Hence, it is possible that any one of the line memories 31 to 34 stores data about one reduce line outputted from the horizontal selector 51 not shown.

The data about the reduction lines are entered in the line memory 31. When data about an x-th reduce line have been stored in the line memory 31, data about the first reduce dot of an (x-+1)-th reduction line are inputted to the line memory 31 and data about the first reduce dot of the x-th reduce line are outputted from the line memory 31. The line memories 32 and 33 operate in a similar manner.

Hence, since the line memory 33 is connected to the line memory 32 by the switch SW1, at a point when the data about the first reduced dot of the x-th reduction line are outputted from the line memory 33, data about the first reduced dots of the (x+1)-th, an (x+2)-th and an (x+3)-th reduction lines are outputted respectively from the line memories 32 and 31 and the horizontal selector 51 (i.e., the input terminal 73a of the vertical decimation forward stage 73).

Thus, data about the first reduced dots of the x-th, the (x+1)-th, the (x+2)-th and the (x+3)-th reduced lines are multiplied by predetermined coefficients in the calculator units 41, 39, 38 and 37, respectively, to be thereafter added up together at the adder 42.

In a similar manner, data about vertically adjacent reduced dots are filtered by a four-terminal filter which is formed by the calculator units 41, 39, 38 and 37 and the adder 42, whereby an x-th filtered reduced line is calculated.

An output of the adder 42 is fed to the line memory 34 through the switch SW2 and thence to the output terminal 73c through the switch SW3. In this case, the line memory 34 and the switch SW3 correspond to the line memory 52 and the wire 56 of FIG. 8. Hence, two vertically adjacent reduced dots of an (x-1)-th and the x-th reduced lines are given to the output terminals 73b and 73c, respectively. Thus, in a manner similar to that described in <A. Basic Procedures of Decimation>, the vertical direction decimation circuit 92 performs decimation in the vertical direction.

The degree of the filter is dependent on how to express a reduced image and therefore can be determined in accordance with how the calculator units and the adder are connected with each other. As described above, in the third preferred embodiment, the degree of the filter can be changed in accordance with the reduction ratio.

<E. Other Modifications>

The foregoing has described the first to the third preferred embodiments in relation to where the memory lines of the vertical decimation forward stage are formed by line memories which are capable of storing equal portions of data about one original line. However, the memory lines of the vertical decimation forward stage may not be formed as such. Rather, different line memories may have different memory capacities. In that case, however, the line memory which has the smallest capacity determines whether it is possible to perform filtering when the reduction ratio of a certain value.

While the invention has been described in detail, the foregoing description is in all aspects illustrative and not restrictive. It is understood that numerous other modifications and variations can be devised without departing from the scope of the invention.

I claim:

1. An image date conversion circuit comprising:
    a first decimation circuit for receiving a plurality of original lines of an original image to be reduced, a first number of said original lines being arranged in a first direction to form said original image, each of said original lines consisting of a second number of original dots which are arranged in a second direction which is perpendicular to said first direction, and for outputting reduced lines each consisting of a third number of reduced dots which are arranged in said second direction, said third number being smaller than said second number; and
    a second decimation circuit for receiving a plurality of said reduced lines and for outputting a fourth number of determined reduced lines which are arranged in said first direction to form a reduced image, said fourth number being smaller than said first number, wherein said second decimation circuit comprises a line memory which is formed of a plurality of memory elements each capable of storing one of said reduced lines, a sum of memory capacities of said memory elements being sufficiently large to store one of said original lines, wherein said line memory is partitioned into a first portion which includes at least one of said memory elements and a second portion which includes at least one of said memory elements and which is disposed before said first portion, wherein when a reduction ratio of a size of said reduced image to a size of said original image is larger than a predetermined value, said second portion is combined with said first portion so as to serially store said reduced lines, and wherein when said reduction ratio is equal to or smaller than said predetermined value, said second portion filters said reduced lines to obtain filtered reduced lines and said first portion serially stores said filtered reduced lines.

2. The image data conversion circuit of claim 1, wherein said first number and said third number are equal to said second number and said fourth number, respectively.

3. The image data conversion circuit of claim 1, wherein said line memory is a first in-first out memory.

4. The image data conversion circuit of claim 1, wherein in said first decimation circuit, at least one interpolation dot is obtained by executing a first interpolation computation on two adjacent specified original dots of an original line, and wherein
    said reduced dots are selected from said specified dots and said one interpolation dot.

5. The image data conversion circuit of claim 4, wherein said first decimation circuit comprises:
    a latch having an input terminal for receiving said original dots and an output terminal and which is capable of storing one of said original dots;
    a bypass having an input terminal and an output terminal, said input terminal of said bypass being connected to said input terminal of said latch;
    first interpolation calculating means having a plurality of input terminals and at least one output terminal, said input terminals of said first interpolation calculating means being connected to said output terminals of said latch and said output terminal of said bypass, and said output terminal of said first interpolation calculating means receiving a result of said first interpolation computation; and a first selector comprising a plurality of input terminals which are connected to said output terminals of said latch, said bypass and said first interpolation calculating means, said first selector outputting said reduced dots.

6. The image data conversion circuit of claim 1, wherein said second decimation circuit comprises:

a computation part for performing a predetermined computation on at least two inputs and outputs of said memory element of said second portion to thereby obtain said filtered reduced lines; and a bypass into which said filtered reduced lines which are serially stored in said first portion are serially read from said first portion, wherein when one of said filtered reduced lines is read from said first portion, a subsequent one of said filtered reduced lines which was calculated following said one of said filtered reduced lines is synchronously written into said bypass, and wherein one of said determined reduced lines is generated from said one of said subsequent one of said filtered reduced lines.

7. The image data conversion circuit of claim 6, wherein in second decimation circuit, a second interpolation computation is performed to obtain at least one interpolation line based on said one and said subsequent one of said filtered reduced lines to thereby select one of said determined reduced lines from said interpolation line and said one and said subsequent one of said filtered reduced lines.

8. The image data conversion circuit of claim 7, wherein second decimation circuit comprises:

second interpolation calculating means for receiving outputs of said first portion of said line memory and of said bypass and for outputting said interpolation line; and a second selector for receiving, at a plurality of input terminals, thereof outputs of from said output terminals of said first portion of said line memory, said bypass and said second interpolation line, said second selector outputting said determined reduced lines.

9. The image data conversion circuit of claim 6, wherein each of said memory elements has a word length which is equal to half the number of said original dots which are included in one of said original lines and a data width which is equal to twice a number of bits which are needed to represent said original dots, wherein said second portion corresponds to a most significant memory side of said memory element and stores the most significant bits, and wherein said first portion corresponds to a least significant memory side of said memory element and stores the least significant bits.

10. The image data conversion circuit of claim 6, wherein said computation part comprises:

a multiplier for multiplying at least two inputs and outputs of said memory elements respectively by predetermined coefficients; and an adder for adding results which are obtained by said multiplier, wherein an output of said adder corresponds to each of said filtered reduced lines.

11. The image data conversion circuit of claim 10, further comprising at least one selection means for determining which two or more of said inputs and said outputs of said memory elements should be processed using said predetermined coefficients.

12. The image data conversion circuit of claim 11, wherein said multiplier comprises:

a first multiplier element for multiplying an input of said second portion by one of said predetermined coefficients; and a second multiplier element for multiplying an output of said second portion by one of said predetermined coefficients.

13. The image data conversion circuit of claim 11, wherein memory capacities of said first and said second portions are changeable depending on lengths of said reduced lines.

14. The image data conversion circuit of claim 13, wherein said second decimation circuit comprises first switch-over means for determining whether said memory elements should belong to said first portion or to said second portion, said first switch-over means being disposed between said memory elements.

15. The image data conversion circuit of claim 14, wherein said second decimation circuit further comprises second switch-over means, said second switch-over means connecting said bypass to said second portion in accordance with a change in structure of said second portion due to a switch-over operation of said first switch-over means.

16. The image data conversion circuit of claim 15, wherein said second switch-over means is capable of performing a number of switch-over selections equal in number to a number of said memory elements which are included in said second portion.

17. The image data conversion circuit of claim 16, wherein said second decimation circuit further comprises control means for controlling said first and said second switch-over means.

* * * * *